3,230,198
THERMOSETTING, CRYSTALLINE, METHYLOL-
ATED-4,4'-DIHYDROXYDIPHENYL SULFONES
Cal Y. Meyers, Princeton, N.J., assignor to Union Carbide Corporation, a corporation of New York
No Drawing. Filed Sept. 1, 1961, Ser. No. 135,451
17 Claims. (Cl. 260—49)

This invention relates to thermosetting, crystalline, methylolated sulfones and to a method for the preparation thereof. More particularly, this invention relates to thermosetting, crystalline methylolated-4,4'-dihydroxydiphenyl sulfones which are produced on reacting formaldehyde with 4,4'-dihydroxydiphenyl sulfone.

The thermosetting, crystalline, methylolated-4,4'-dihydroxydiphenyl sulfones of this invention have the formula:

Formula I $$HO-\underset{R'}{\overset{R^2}{\bigcirc}}-\overset{O}{\underset{O}{S}}-\underset{R}{\overset{CH_2OH}{\bigcirc}}-OH$$

wherein R, R' and $R^2$, which can be the same or different, are either hydrogen or methylol ($-CH_2OH$).

Methylolated-4,4'-dihydroxydiphenyl sulfones falling within the purview of Formula I are the following:

Formula II $$HO-\bigcirc-\overset{O}{\underset{O}{S}}-\overset{CH_2OH}{\bigcirc}-OH$$

monomethylol-4,4'-dihydroxydiphenyl sulfone

Formula III $$HO-\bigcirc-\overset{O}{\underset{O}{S}}-\underset{CH_2OH}{\overset{CH_2OH}{\bigcirc}}-OH$$

3,5-dimethylol-4,4'-dihydroxydiphenyl sulfone

Formula IV $$HO-\underset{CH_2OH}{\bigcirc}-\overset{O}{\underset{O}{S}}-\overset{CH_2OH}{\bigcirc}-OH$$

3,3'-dimethylol-4,4'-dihydroxydiphenyl sulfone

Formula V $$HO-\underset{CH_2OH}{\bigcirc}-\overset{O}{\underset{O}{S}}-\underset{CH_2OH}{\overset{CH_2OH}{\bigcirc}}-OH$$

3,3',5-trimethylol-4,4'-dihydroxydiphenyl sulfone

Formula VI $$HO-\underset{CH_2OH}{\overset{CH_2OH}{\bigcirc}}-\overset{O}{\underset{O}{S}}-\underset{CH_2OH}{\overset{CH_2OH}{\bigcirc}}-OH$$

3,3',5,5'-tetramethylol-4,4'-dihydroxydiphenyl sulfone

The thermosetting, crystalline, methylolated 4,4'-dihydroxydiphenyl sulfones of this invention, by reason of their crystalline form, are excellently suited for use as cross-linking agents for thermoplastic polymers such as polyvinyl acetate. The cured products so produced have greatly improved color properties. In addition, the thermosetting, crystalline compounds of this invention, upon being cured to infusible products, yield products which are nonflammable and which are characterized by excellent toughness. Furthermore, upon adding the thermosetting, crystalline compounds of this invention to thermosetting phenolic resins, thermosetting compositions are provided which have greatly improved heat-resistance. Also, the compounds of this invention, by reason of their crystalline form, can be easily handled and stored.

The preparation of compounds falling within the scope of Formula I wherein R, R' and $R^2$ are either hydrogen or methylol is accomplished by reacting formaldehyde with 4,4'-dihydroxydiphenyl sulfone, in the presence of a catalyst, which reacts with the hydroxy groups of the sulfone to form the corresponding salt, to produce the corresponding hemiformal. The 3-positioned hemiformalated salt is then deformalated to the corresponding methylolated compound by adding to the hemiformal additional quantities of the catalyst previously described. The methylolated salt is then hydrolyzed to its OH form by the addition thereto of an acid having a Ka value greater than $4 \times 10^{-7}$.

These three series of reactions can be exemplified by the following equations wherein, for convenience, there is shown the preparation of monomethylol-4,4'-dihydroxydiphenyl sulfone using sodium hydroxide as the catalyst and HCl as the acid which "springs" the salt.

Equation I $$HO-\bigcirc-\overset{O}{\underset{O}{S}}-\bigcirc-OH + 2CH_2O + 2NaOH \longrightarrow$$

$$NaO-\bigcirc-\overset{O}{\underset{O}{S}}-\overset{CH_2OCH_2OH}{\bigcirc}-ONa + 2HOH$$

Equation II $$2NaO-\bigcirc-\overset{O}{\underset{O}{S}}-\overset{CH_2OCH_2OH}{\bigcirc}-ONa + NaOH \longrightarrow$$

$$2NaO-\bigcirc-\overset{O}{\underset{O}{S}}-\overset{CH_2OH}{\bigcirc}-ONa + HCO_2Na + CH_3OH$$

Equation III $$NaO-\bigcirc-\overset{O}{\underset{O}{S}}-\overset{CH_2OH}{\bigcirc}-ONa + 2HCl \longrightarrow$$

$$HO-\bigcirc-\overset{O}{\underset{O}{S}}-\overset{CH_2OH}{\bigcirc}-OH + 2NaCl$$

In reacting formaldehyde with 4,4'-dihydroxydiphenyl sulfones to produce hemiformals, which when deformalated and hydrolyzed, yield compounds falling within the scope of Formula I wherein R, R' and $R^2$ are either hydrogen or methylol, these compounds being monomethylol-4,4'-dihydroxydiphenyl sulfone, 3,3'-dimethylol-4,4'-dihydroxydiphenyl sulfone, 3,3',5-trimethylol-4,4'-dihydroxydiphenyl sulfone, and 3,3',5,5'-tetramethylol-4,4'-dihydroxydiphenyl sulfone, the amount of formaldehyde used will depend upon the number of methylol groups desired to be attached to the rings of the sulfone. The amount of formaldehyde used in each instance, depending upon the compound desired to be produced, in tabulated below.

| Desired compound | Moles of formaldehyde per mole of 4,4'-dihydroxydiphenyl sulfone | |
|---|---|---|
| | Satisfactory range | Preferred range |
| Monomethylol-4,4'-dihydroxydiphenyl sulfone. | 2–2.5 to 1 | 2 to 1. |
| 3,3'-dimethylol-4,4'-dihydroxydiphenyl sulfone. | 4–5 to 1 | 4 to 1. |
| 3,3',5-trimethylol-4,4'-dihydroxydiphenyl sulfone. | 6–7 to 1 | 6 to 1. |
| 3,3',5,5'-tetramethylol-4,4'-dihydroxydiphenyl sulfone. | More than 8 | 8 to 1. |

As previously stated, the reaction between 4,4'-dihydroxydiphenyl sulfone and formaldehyde is conducted in the presence of a catalyst which reacts with the hydroxy groups of the sulfone to form the corresponding salt. Illustrative of such catalysts are the alkali metal hydroxides such as sodium hydroxide, potassium hydroxide, lithium hydroxide and the like.

The amount of catalyst used is generally about 1–2 moles per mole of sulfone and preferably about 2 moles per mole of sulfone.

The reaction by which the hemiformal is formed is conducted at temperatures on the order of about 50° C. to about 90° C. and preferably on the order of about 60° C. to about 80° C. The reaction is conducted until about 2 moles of formaldehyde have been consumed, per each methylol group desired to be substituted onto the rings of the sulfone, evidenced by the disappearance of 1 mole of formaldehyde per each desired methylol group, as measured by the hydroxylamine hydrochloride method.

Deformalation of the hemiformal salt is generally accomplished by adding to the hemiformal salt at least about one mole, per each two moles of formaldehyde consumed, of a compound previously listed in this specification as a catalyst. The amount of deformalation compound used is preferably about 0.5 mole to about 1 mole, per each two moles of formaldehyde consumed. More than about 1 mole of the deformalation compound can be used but this is economically undesirable as the rate of the reaction is not materially increased.

The deformalation reaction conducted as described in the preceding paragraph is generally carried out at a temperature on the order of about 60° C. to about 110° C. and preferably on the order of about 95° C. to about 100° C.

As an "alternative" method of deformalating the hemiformal salt, rather than adding additional catalyst thereto, the hemiformal salt is first hydrolyzed to the corresponding phenolic derivative, in a manner as will hereinafter be described. The phenolic derivative so formed will then lose formaldehyde to form the desired methylolated compound. In order to increase the speed at which such phenolic derivative loses formaldehyde, it is generally placed under a vacuum of about 10 mm. of Hg to about 20 mm. Hg at temperatures on the order of about 20° C. to about 50° C.

As another alternative method of deformalating the hemiformal salt, the hemiformal salt is acidified to a pH of about 2 to about 3, thereby forming the hemiformalated free phenol. This product is water washed to a negative formaldehyde test yielding the corresponding methylolated product.

In all instances, deformalation of the hemiformal is deemed to have proceeded to completion when the $CH_2O$ test is negative.

"Springing" of the salt to its OH form, once deformalation is complete, is generally accomplished by the addition thereto of an acid having a Ka value of greater than $4 \times 10^{-7}$. Illustrative of such acids are the following: hydrochloric, phosphoric, chloracetic and the like. Other acids suitable for purposes of this invention, i.e., having a Ka value of greater than $4 \times 10^{-7}$, are enumerated on pages 1425–1426 of the 30th edition, 1947, of the Handbook of Chemistry and Physics, these pages being incorporated herein by reference.

The amount of acid used is sufficient to hydrolyze the salt to its OH form. This amount is generally about 1 to about 1.5 equivalents per each equivalent of cation to be replaced.

The hydrolyzation reaction by which the methylolated salt is converted to its OH form is usually conducted at temperatures on the order of about 10° C. to about 30° C., and preferably on the order of about 15° C. to about 20° C.

The 3,5-dimethylol-4,4'-dihydroxydiphenyl sulfone, rather than being formed from the corresponding hemiformal, is produced by heating at temperatures on the order of about 50° C. to about 110° C. and preferably on the order of about 60° C. to about 80° C., the salt of 3,3',5-trimethylol-4,4'-dihydroxydiphenyl sulfone in contact with a dialkyl sulfate to produce the salt of 3,5-dimethylol-4,4'-dihydroxydiphenyl sulfone. This salt is then hydrolyzed in an acid medium to its OH form in a manner as previously defined.

The reaction involving the salt of 3,3',5-trimethylol-4,4'-dihydroxydiphenyl sulfone in contact with a dialkyl sulfate can be exemplified by the following equation wherein for convenience the disodium salt of 3,5-trimethylol-4,4'-dihydroxydiphenyl sulfone is shown as being produced.

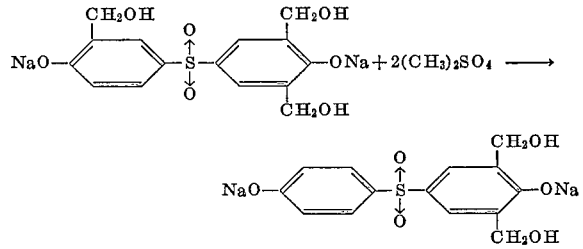

Among dialkyl sulfates suitable for purposes of this invention can be noted dimethyl sulfate, diethyl sulfate, di-n-propyl sulfate and the like, generally wherein each alkyl group contains a maximum of 4 carbon atoms, and preferably wherein each alkyl group contains a maximum of 2 carbon atoms.

Recovery of the desired methylolated sulfone from the reacted mixture can be accomplished in any convenient manner. For example, the methylolated sulfones are generally recovered as a filter cake. Once recovered, they are usually washed and dried to constant weight.

The methylolated 4,4'-dihydroxydiphenyl sulfones of this invention, as previously stated, can be added to condensation products of a phenol and an aldehyde to provide thermosetting phenolic resin compositions which have excellent heat resistivity and therefore are particularly desirable for use in applications wherein resistivity to heat is essential. These compositions can be formed into shaped structures and successfully used as parts for missiles and high speed aircraft as they undergo none of the undesirable dimensional changes attributed to presently known thermosetting phenolic resin compositions. In addition, these compositions, by reason of their relatively light weight and by reason of their resistivity to heat, i.e., retention of physical strengths on high temperature aging, are preferred over ceramics and metals in applications wherein relative lightness in weight and heat resistivity are desired.

On utilizing the reaction products of this invention as additives to thermosetting phenolic resin compositions, they are used in a heat stabilizing amount, this is in an amount sufficient to stabilize the phenolic compositions against the effect of heat. Generally, the compositions contain from about 3 percent by weight to about 250 percent by weight and preferably from about 25 percent by weight to about 100 percent by weight, based on the weight of the condensation product of a phenol and an aldehyde.

In those instances wherein the condensation product of a phenol and an aldehyde is a liquid, the weight thereof is based upon its solids content. The solids content is determined according to the following procedure: a 1.5 gram sample of the condensate is heated in an oven, which is at 135° C., for 3 hours. The residue is then cooled to room temperature, about 23° C., and weighed. The numerical weight of the residue is divided by the numerical weight of the sample and the result multiplied by 100. The result obtained indicates the percent weight per 1.5 grams of liquid condensate.

Suitable condensation products of a phenol and an aldehyde, for purposes of this invention, are the condensates, generally acid catalyzed, referred to as "novolac resins" and condensates, generally alkaline catalyzed, referred to as "resole resins."

Condensates, referred to as "novolac resins" are usually prepared by condensing a phenol and an aldehyde in the presence of an acid such as oxalic acid, sulfuric acid and the like or in the presence of a metal salt of an acid such as zinc acetate; wherein the aldehyde is present in the reaction mixture in less than stoichiometric amounts. Novolac resins are generally fusible, brittle, grindable resins.

Condensates, referred to as "resole resins" are usually prepared by condensing a phenol and an aldehyde in the presence of a base such as an alkali metal oxide or hydroxide or an alkaline earth metal oxide or hydroxide, as for example, sodium hydroxide, potassium hydroxide, calcium hydroxide, calcium oxide and the like, or an amine, or ammonia; wherein the aldehyde is present in the reaction mixture in greater than stoichiometric amounts. The resoles can be either liquid resins, soft resins having a low melting point or hard, brittle, grindable resins and are heat-hardenable per se to the infusible state, that is, they will thermoset to infusible products under the influence of heat.

Illustrative of suitable phenols which can be condensed with an aldehyde to produce condensation products of a phenol and an aldehyde whose heat-resistance can be significantly improved by the addition thereto of a methylolated 4,4'-dihydroxydiphenyl sulfone can be noted: phenol; dihydric phenols such as resorcinol; meta-substituted phenols such as the meta-alkylated phenols exemplary of which are m-cresol, m-ethylphenol, m-n-propylphenol, m-isopropylphenol, m-n-butylphenyl, m-sec-butylphenyl, m-tert-butylphenol, m-amylphenol and other like phenols, particularly those wherein the alkyl substitutent contains from 1 to 6 carbon atoms inclusive, as well as the commercially available meta-cresol which contains small amounts of both the para and the ortho isomers; meta-substituted alkoxy phenols such as m-methoxyphenol, m-ethoxyphenol, m-n-propoxyphenol, and the like, particularly those wherein the alkoxy group contains from 1 to 6 carbon atoms inclusive; meta-halogenated phenols such as m-chlorophenol, m-bromophenol and the like.

Examples of aldehydes which can be condensed with the phenols listed above to produce the phenol-aldehyde condensates are: formaldehyde in any of its available forms, i.e., formalin, para-formaldehyde; furfural and the like.

For a detailed discussion of condensates produced from a phenol and an aldehyde and methods for the production thereof, reference is made to the books: "Phenoplasts" by T. S. Carswell, published in 1947 by Interscience Publishers and "Chemie der Phenolharze," by K. Hultzsch, Springer Verlag, 1950, which are incorporated herein by reference.

The thermosetting phenolic resin compositions can be formulated by a number of convenient methods. A particularly preferred method of preparation is one wherein a condensate of a phenol and an aldehyde is prepared in a resin still and the desired methylolated 4,4'-dihydroxydiphenyl sulfone added directly thereto just prior to the dehydration of the condensate. As an illustration of this preferred method, a composition could be prepared as follows: Into a still there is charged 150 parts by weight of formalin (37%) and 100 parts by weight phenol. Three parts by weight barium hydroxide are then added and the contents in the still brought to 80° C. and maintained at this temperature for 2 hours while under a pressure of 330 mm. of Hg. At the end of the two hour period, the contents of the still are neutralized and then brought to a pH of 3.50 to 4.50 by the addition thereto of phosphoric acid (75%). Thereafter, 70 parts by weight of a methylolated 4,4'-dihydroxydiphenyl sulfone are added into the still. The contents of the still are vacuum dehydrated up to a temperature of about 90° C. to about 100° C. under a pressure of about 25–75 mm. of Hg. The composition so obtained upon being cooled to room temperature, about 23° C., is heat-hardenable, that is, capable of thermosetting to an infusible product, and grindable.

As another convenient method of formulating compositions of this invention, a condensate of a phenol and an aldehyde can be compounded with a suitable methylolated 4,4'-dihydroxydiphenyl sulfone on a two-roll mill to form a homogeneously blended composition.

If so desired, any of the conventional catalysts used to promote the thermosetting of phenolic resins can be used, in all instances, as an aid in thermosetting phenolic compositions of this invention. These catalysts, when employed, are used in amounts of from about 1 percent by weight to about 20 percent by weight, preferably from about 2 percent by weight to about 6 percent by weight based on the combined weight of the methylolated 4,4'-dihydroxydiphenyl sulfone and the condensate of a phenol and an aldehyde. Exemplary of such catalysts are the alkali metal hydroxides such as sodium hydroxide, potassium hydroxide and the like; the alkaline earth metal hydroxides such as calcium hydroxide and the like; alkaline earth metal oxides such as calcium oxide and the like.

Compositions of this invention can also contain various other additives, as are well-known in the art. Illustrative of such additives are the so-called fillers which are inert materials usually added to phenolic resin compositions in order to improve the physical characteristics thereof. Illustrative of such fillers are the following: the mineral fillers such as asbestos, wollastonite, mica, silica, graphite cloth, graphite fibers, and the like; and organic fillers such as woodflour, cotton flock, polyamide fibers, polyester fibers, and the like.

Fillers, when used, are generally employed in amounts of from about 15 percent by weight to about 300 percent by weight based on the combined weight of the methylolated 4,4'-dihydroxydiphenyl sulfone and the condensate of a phenol and an aldehyde.

Other materials, commonly added to phenolic resin compositions, are lubricants such as carnauba wax, candelilla wax, zinc stearate and the like; and colorants such as titanium dioxide and the like.

As previously pointed out, the compounds of this invention and compositions based thereon have particular utility as compositions which can be molded into articles of desired shape and the articles so produced used in applications wherein excellent resistance to heat is required. The exact conditions under which compositions of this invention can be molded will, of course, vary depending in part upon the particular composition being molded and the configuration and size of the article being formed. As a general rule, suitable molding temperatures range from about 150° C. to about 200° C.

In formulating molding compositions containing thermosetting phenolic resins various compounding techniques can be used. Among such techniques can be noted the following:

(1) Dry blending a condensate of a phenol and an aldehyde, a methylolated 4,4'-dihydroxydiphenyl sulfone and any desired additive in a ball mill, drum tumbler, or in a ribbon blender.

(2) Fluxing a condensate of a phenol and an aldehyde, a methylolated 4,4'-dihydroxydiphenyl sulfone and any desired additive in a differential speed mill, a Banbury mixer or in an extruder, cooling the fluxed composition to room temperature, about 23° C. and grinding the fluxed composition to the desired particle size.

(3) Forming an organic solution or an aqueous solution of a mixture of a condensate of a phenol and an aldehyde and a methylolated 4,4'-dihydroxydiphenyl sulfone, impregnating a filler such as asbestos with the solution, drying the impregnated filler and dicing the impregnated filler to the desired size.

(4) Forming a water slurry of a condensate of a phenol and an aldehyde, a methylolated 4,4'-dihydroxydiphenyl sulfone and any desired additive, dropping the slurry onto a screen of a Fourdrinier paper-making machine, drying the slurry to form a mat and then chopping the mat into small pieces of desired size.

The examples which follow illustrate the present invention and are not intended to limit the scope thereof in any manner.

EXAMPLE 1

*Preparation of 3,3',5,5'-tetramethylol-4,4'-dihydroxydiphenyl sulfone*

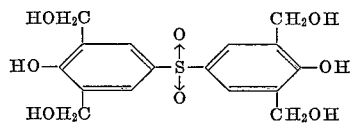

(a) A solution of 500 ml. of water in which there was dissolved 250 grams (1 mole) of 4,4'-dihydroxydiphenyl sulfone and 80 grams (2 moles) of sodium hydroxide was heated to 60° C. To this heated solution, there was then added 656 grams (8 moles) of formaldehyde (37%). The resultant solution was heated at a temperature of 60° C. for 20 hours. At the end of 20 hours, four moles of formaldehyde had been found to have been consumed. Eighty grams (2 moles) of sodium hydroxide were then slowly introduced into the solution which the solution was heated at 100° C. for about 30 minutes. At the end of this time, no formaldehyde odor was apparent and no trace of formaldehyde could be determined as being present in the solution. The solution was cooled to a temperature of about 10° C. in an ice bath and its pH was brought to 3-4 by the addition thereto of hydrochloric acid. The white crystals of 3,3',5,5'-tetramethylol-4,4'-dihydroxydiphenyl sulfone which precipitated were recovered by a filtration operation and dried to constant weight in a vacuum oven.

The 3,3',5,5' - tetramethylol-4,4' - dihydroxydiphenyl sulfone, recovered in the from of white crystals, was found to have a melting point of 192° C. and a neutralization equivalent of 184. The theoretical neutralization equivalent of 3,3',5,5'-tetramethylol-4,4'-dihydroxydiphenyl sulfone is 185.

*Analysis for 3,3',5,5'-tetramethylol-4,4'-dihydroxydiphenyl sulfone.*—Found: C, 52.53; H, 4.91; S, 9.10. Calculated: C, 51.90; H, 4.86; S, 8.64.

3,3'-5,5' - tetramethylol - 4,4'-dihydroxydiphenyl sulfone is soluble in water, acetone and ethyl alcohol; insoluble in benzene.

The compound was cured to an infusible product by heating at 200° C. No formaldehyde evolved during the curing cycle.

The structure of this sulfone was confirmed by ultraviolet analysis, infrared analysis and dissociation constants. Values for each are noted below.

ULTRAVIOLET ANALYSIS

| λ maximum, μm. | ε maximum |
|---|---|
| 209 | 37,000 |
| 239 | 2,960 |
| 273 | 10,700 |
| 295 | 5,500 |

INFRARED ANALYSIS (CM.$^{-1}$)

| | |
|---|---|
| 1282 | Strong. |
| 1137 | Strong. |
| 1103 | Strong. |

DISSOCIATION CONSTANTS (50% AQUEOUS ETHANOL)

$pK_{a1}$ ---- 7.58
$pK_{a2}$ ---- 8.96

In order to show that the reaction of a sulfone and formaldehyde proceeds as described with a maximum of 4 moles of formaldehyde consumed per mole of sulfone, Example 1 was repeated in part with the exception that in each instance greater amounts of formaldehyde were used. The actual amount of formaldehyde used and the amounts found to have been consumed in each instance are noted below.

(b) Eight hundred and twenty grams (10 moles) of 37% formaldehyde were used. After 20 hours, 4 moles of formaldehyde had been consumed.

EXAMPLE 2

*Preparation of 3,3'-dimethylol-4,4'-dihydroxydiphenyl sulfone*

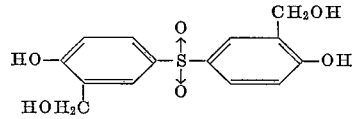

A solution of 250 grams (1 mole) of 4,4'-dihydroxydiphenyl sulfone, 80 grams (2 moles) of sodium hydroxide and 328 grams (4 moles) of formaldehyde (37%) was heated at 60° C. for 20 hours. The residual formaldehyde was asymptotic at 2 moles indicating the presence of a di hemiformal. Forty grams (1 mole) of sodium hydroxide were then added to the solution and the temperature of the solution was maintained at 60° C. for 40 minutes. At the end of this time, no formaldehyde odor was apparent and no trace of formaldehyde could be determined as being present in the solution by means of the "formaldehyde" test. The solution was cooled to about 10° C. in an ice bath and the pH of the solution was adjusted to 4 by the addition thereto of hydrochloric acid. The tan colored, viscous solid which precipitated was recovered by a filtration operation, washed thoroughly with 500 ml. of water and vacuum desiccated to constant weight over sodium hydroxide pellets. The product was recrystallized from ethyl acetate yielding white crystals.

The 3,3'-dimethylol-4,4'-dihydroxydiphenyl sulfone recovered in the form of white crystals, was found to have a melting point of 77° C. and a neutralization equivalent of 159. The theoretical neutralization equivalent of 3,3'-dimethylol-4,4'-dihydroxydiphenyl sulfone is 155.

*Analysis for 3,3'-dimethylol-4,4'-dihydroxydiphenyl sulfone.*—Found: C, 54.21; H, 2.10; S, 10.32. Calculated: C, 54.20; H, 4.52; S, 10.32.

3,3'-dimethylol-4,4'-dihydroxydiphenyl sulfone is soluble in water, ethyl acetate and ethyl alcohol; insoluble in benzene.

This compound cured to an infusible product by heating at 200° C. No formaldehyde evolved during the curing cycle.

The structure of this sulfone was confirmed by ultraviolet analysis, infrared analysis and dissociation constants. Values for each are noted below:

ULTRAVIOLET ANALYSIS

| λ maximum, μm. | ε maximum |
|---|---|
| 207 | 39,680 |
| 237 | 12,400 |
| 262 | 18,600 |
| 273 | 15,500 |

INFRARED ANALYSIS (CM.$^{-1}$)

| | |
|---|---|
| 1285 | Strong. |
| 1143 | Very strong. |
| 1102 | Strong. |

DISSOCIATION CONSTANTS (50% AQUEOUS ETHANOL)

| | |
|---|---|
| $pK_{a1}$ | 8.17 |
| $pK_{a2}$ | 9.60 |

EXAMPLE 3

This example illustrates the preparation of 3,3'-dimethylol-4,4'-dihydroxydiphenyl sulfone, by an "alternative" method previously described.

A solution of 250 grams (1 mole) of 4,4'-dihydroxydiphenyl sulfone, 80 grams (2 moles) of sodium hydroxide and 328 grams (4 moles) of formaldehyde (37%) was heated at 60° C. for 20 hours. The residual formaldehyde was asymptotic at 2 moles. The solution was cooled to a temperature of about 10° C. in an ice bath and the pH of the solution was brought to 3 by the addition thereto of hydrochloric acid. The tan colored, viscous solid which precipitated was recovered by a filtration operation, and washed with water until the water washings were free of chloride ions. The product was then vacuum desiccated over sodium hydroxide pellets to constant weight.

The 3,3'-dimethylol-4,4'-dihydroxydiphenyl sulfone so produced had a Neutralization Equivalent of 158.

*Analysis for 3,3' - dimethylol - 4,4'-dihydroxydiphenyl sulfone.*—Found: C, 53.93; H, 4.40; S, 10.39. Calculated: C, 54.19; H, 4.52; S, 10.32.

Ultraviolet and infrared analysis values were the same as noted in Example 2.

EXAMPLE 4

*Preparation of monomethylol-4,4'-dihydroxydiphenyl sulfone*

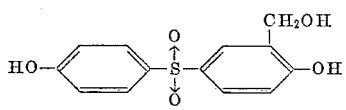

A solution of 250 grams (1 mole) of 4,4'-dihydroxydiphenyl sulfone, 80 grams (2 moles) of sodium hydroxide and 82 grams (1 mole) of 37% formaldehyde was heated at 60° C. for 12 hours. At the end of this period, 0.5 mole of formaldehyde had been consumed as indicated by the "formaldehyde" test. Ten grams (0.25 mole) of sodium hydroxide were slowly introduced into the solution and then the solution was heated at 100° C. for about 15 minutes. At the end of 15 minutes, the odor of formaldehyde disappeared and no trace of formaldehyde was detected. The solution was cooled to a temperature of about 10° C. in an ice bath and its pH brought to 2.3 by the addition of hydrochloric acid. The white crystals which precipitated were recovered by a filtration operation, washed with 500 ml. of water (the water washings being saved for further treatment) and dried in a vacuum oven to constant weight.

This proved to be 4,4'-dihydroxydiphenyl sulfone, recovered in the form of white crystals, having a melting point of 245° C. and represented 45% of unchanged starting material.

The water washings noted in a previous step were concentrated to a solid residue in a vacuum and the residue so produced recrystallized from ethyl acetate.

This was identified as monomethylol-4,4'-dihydroxydiphenyl sulfone recovered in the form of white crystals, melted at 150° C., and found to have a Neutralization Equivalent of 140. The theoretical Neutralization Equivalent for monomethylol-4,4'-dihydroxydiphenyl sulfone is 140.

*Analysis for monomethylol - 4,4' - dihydroxydiphenyl sulfone.*—Found: C, 55.90; H, 4.37; S, 11.70. Calculated: C, 55.72; H, 4.29; S, 11.43.

The structure of this sulfone was confirmed by ultraviolet analysis, infrared analysis and dissociation constants. Values for each are noted below.

ULTRAVIOLET ANALYSIS

| λ maximum, μm. | ε maximum |
|---|---|
| 204 | 47,600 |
| 236 | 12,880 |
| 260 | 19,040 |
| 295 | 2,800 |

INFRARED ANALYSIS (CM.$^{-1}$)

| | |
|---|---|
| 1282 | Strong. |
| 1143 | Strong. |
| 1102 | Strong. |

DISSOCIATION CONSTANTS (50% AQUEOUS ETHANOL)

| | |
|---|---|
| $pK_{a1}$ | 8.31 |
| $pK_{a2}$ | 9.53 |

EXAMPLE 5

*Preparation of 3,3',5-trimethylol-4,4'-dihydroxydiphenyl sulfone*

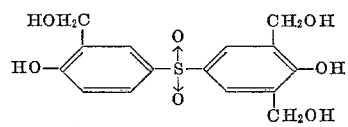

A solution of 250 grams (1 mole) of 4,4'-dihydroxydiphenyl sulfone, 40 grams (1 mole) of sodium hydroxide and 492 grams (6 moles) of formaldehyde (37%) was heated at 100° C. until an asymptotic consumption of three moles of formaldehyde per mole of sulfone was obtained. This took approximately 150 minutes. The pH of the solution was then adjusted to 3 by the addition thereto of hydrochloric acid. The white crystals of 3,3',5 - trimethylol - 4,4' - dihydroxydiphenyl sulfone which precipitated were recovered by a filtration operation, recrystallized from water, and dried to constant weight in a vacuum oven.

The 3,3',5-trimethylol-4,4'-dihydroxydiphenyl sulfone recovered in the form of white crystals, was found to have a Neutralization Equivalent of 165. The theoretical Neutralization Equivalent of 3,3',5-trimethylol-4,4'-dihydroxydiphenyl sulfone is 170.

*Analysis for 3,3',5 - trimethylol-4,4'-dihydroxydiphenyl sulfone.*—Found: C, 53.08; H, 4.55; S, 9.43; M.W., 365. Calculated: C, 53.00; H, 4.71; S, 9.41; M.W., 340.

3,3',5 - trimethylol - 4,4' - dihydroxydiphenyl sulfone is soluble in acetone and ethyl alcohol and insoluble in water and benzene.

The structure of this sulfone was confirmed by ultraviolet analysis, infrared analysis and dissociation constants. Values for each are noted below:

ULTRAVIOLET ANALYSIS

| λ maximum, μm. | ε maximum |
|---|---|
| 215 | 34,000 |
| 237 | 11,220 |
| 245 | 9,520 |
| 251 | 8,500 |
| 258 | 9,520 |
| 274 | 12,580 |
| 300 | 6,800 |

INFRARED ANALYSIS (CM.$^{-1}$)

| 1270 | Strong. |
| 1130 | Very strong. |
| 1100 | Strong. |

DISSOCIATION CONSTANTS (50% AQUEOUS ETHANOL)

| $pK_{a1}$ | 7.45 |
| $pK_{a2}$ | 8.90 |

EXAMPLE 6

*Preparation of 3,5-dimethylol-4,4'-dihydroxydiphenyl sulfone*

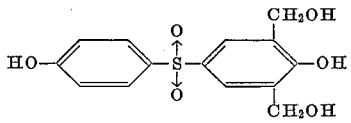

A solution of 3.4 grams (.01 mole) of 3,3',5-trimethylol-4,4'-dihydroxydiphenyl sulfone, 0.8 grams (.02 mole) of sodium hydroxide and 2.52 grams (.02 mole) of dimethyl sulfate in 20 grams of water was heated at 60° C. for one hour. The solution was then cooled to about 10° C. in an ice bath and the pH of the solution brought to 3 by the addition thereto of hydrochloric acid. The crystals of 3,5-dimethylol-4,4'-dihydroxydiphenyl sulfone which preciptated were recovered by a filtration operation, washed with 25 ml. portions of water and dried to constant weight in a vacuum oven.

The 3,5-dimethylol-4,4'-dihydroxydiphenyl sulfone, recovered in the form of crystals, weighed 3.12 grams which is 0.28 grams less than the amount of 3,3',5-trimethylol-4,4'-dihydroxydiphenyl sulfone used. This loss of weight is substantially equal to one gram/mole equivalent of formaldehyde.

3,5 - dimethylol - 4,4' - dihydroxydiphenyl sulfone was found to have a Neutralization Equivalent of 158. The theoretical Neutralization Equivalent of 3,5-dimethylol-4,4'-dihydroxydiphenyl sulfone is 155.

*Analysis for 3,5-dimethylol-4,4'-dihydroxydiphenyl sulfone.*—Found: C, 54.34; H, 4.67; S, 10.10. Calculated: C, 54.19; H, 4.52; S, 10.32.

The structure of this sulfone was confirmed by infrared analysis and dissociation constants. Values for each are noted below:

INFRARED ANALYSIS (CM.$^{-1}$)

| 1272 | Strong. |
| 1130 | Very strong. |
| 1100 | Strong. |

DISSOCIATION CONSTANTS (50% AQUEOUS ETHANOL)

| $pK_{a1}$ | 7.65 |
| $pK_{a2}$ | 9.00 |

EXAMPLE 7

Compositions, whose formulations are noted below, were formed into self-sustaining film having a thickness of about 5 mils by spreading each composition on a hot plate using a spatula and curing each film by heating at 165° C. for a period of time indicated below. The characteristics of the cured film in each instance are also noted in the table which follows:

| Parts by weight | | Trimethylol phenol | Time in seconds | Characteristics of cured film |
|---|---|---|---|---|
| Sulfone | Resin A | | | |
| Alone | | | 130 | Nonflammable. |
| 1 per | 1 | | 123 | Nonflammable, tough. |
| 1 per | 2 | | 153 | Do. |
| 1 per | 0.5 | | 85 | Do. |
| 1 per | 0.4 | | 99 | Do. |
| | Alone | | | Did not cure. |
| 1 | | Per 1 | 85 | Nonflammable. |
| | | Alone | 90 | Flammable. |

The sulfone noted in this example was a mixture, in equal parts by weight, of 3,3'-dimethylol-4,4'-dihydroxydiphenyl sulfone and 3,3',5-trimethylol-4,4'-dihydroxydiphenyl sulfone.

Resin A noted in this example was a novolac resin prepared by heating a mixture containing 100 parts by weight phenol, 69 parts by weight (37%) formaldehyde and 0.56 part by weight oxalic acid for 6 hours at atmospheric reflux. After 6 hours the mixture was dehydrated to a solid residue, the novolac resin, by heating to 150° C.

EXAMPLE 8

Compositions, whose formulations are noted below, were formed into self-sustaining film as described in Example 7, cured to infusible products, granulated, and subjected to a weight loss test by heating at 215° C. for the times indicated.

| Parts by weight | Percent weight loss | |
|---|---|---|
| | After 68 hours | After 140 hours |
| 2 parts by weight sulfone per 1 part by weight Resin A | 0.07 | 0.49 |
| Sulfone alone | 1.5 | 2.7 |
| Resin B | 7.5 | 10.1 |
| Trimethylolphenol | 7.8 | 10.7 |

The sulfone and Resin A noted in this example were the same as described in Example 7.

Resin B noted in this example was a resole resin prepared by heating a mixture containing 100 parts by weight phenol, 200 parts by weight formaldehyde (37%) and 13.6 parts by weight sodium hydroxide (25%) for 2 hours at 70° C. The mixture was brought to a pH of 7.4–7.7 by the addition thereto of hydrochloric acid (37%) and vacuum dehydrated to a 69 percent by weight solids content.

What is claimed is:
1. A thermosetting, crystalline compound having the formula:

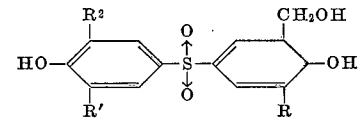

wherein R, R' and R$^2$ are members selected from the group consisting of hydrogen and methylol, with the further limitation that said compound have at least two methylol groups per molecule.

2. The cured product of the compound defined in claim 1.

3. Thermosetting, crystalline 3,5-dimethylol-4,4'-dihydroxydiphenyl sulfone.

4. Thermosetting, crystalline 3,3'-dimethylol-4,4'-dihydroxydiphenyl sulfone.

5. Thermosetting, crystalline 3,3',5-trimethylol-4,4'-dihydroxydiphenyl sulfone.

6. Thermosetting, crystalline 3,3',5,5'-tetramethylol-4,4'-dihydroxydiphenyl sulfone.

7. Method for the preparation of a crystalline, methylolated-4,4'-dihydroxydiphenyl sulfone having the formula:

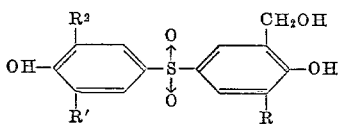

wherein R, R' and R² are members selected from the group consisting of hydrogen and methylol which comprises reacting 4,4'-dihydroxydiphenyl sulfone with at least about 2 moles of formaldehyde, per mole of said sulfone, in contact with about 1 to 2 moles, per mole of said sulfone, of a compound which reacts with said hydroxy groups of said sulfone to form the corresponding salt, to form the corresponding hemiformalated salt, deformalating the hemiformalated salt to the corresponding methylolated salt and hydrolyzing said methylolated salt.

8. Method for the preparation of a crystalline, methylolated-4,4'-dihydroxydiphenyl sulfone having the formula:

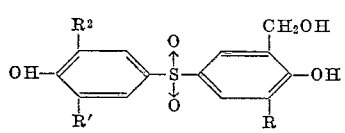

wherein R, R' and R² are members selected from the group consisting of hydrogen and methylol which comprises reacting at temperatures of about 50° C. to about 90° C., 4,4'-dihydroxydiphenyl sulfone with at least about 2 moles of formaldehyde, per mole of said sulfone, in contact with about 1 to 2 moles, per mole of said sulfone, of a compound which reacts with said hydroxy groups of said sulfone to form the corresponding salt, to form the corresponding hemiformalated salt, deformalating the hemiformalated salt to the corresponding methylolated salt and hydrolyzing said methylolated salt.

9. Method as defined in claim 8 wherein the formaldehyde is reacted with 4,4'-dihydroxydiphenyl sulfone at a temperature of about 60° C. to about 80° C.

10. Method for the preparation of a crystalline, methylolated-4,4'-dihydroxydiphenyl sulfone having the formula:

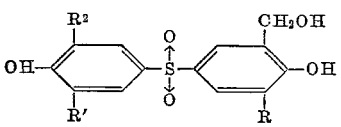

wherein R, R' and R² are members selected from the group consisting of hydrogen and methylol which comprises reacting, at a temperature of about 50° C. to about 90° C., 4,4'-dihydroxydiphenyl sulfone with at least about 2 moles of formaldehyde, per mole of said sulfone, in contact with about 2 moles of an alkali metal hydroxide, per mole of said sulfone, to form the corresponding hemiformalated salt, deformalating said hemiformalated salt to the corresponding methylolated salt and hydrolyzing said methylolated salt.

11. Method as defined in claim 10 wherein said deformalation is conducted by reacting said hemiformal salt with about 0.5 to 1 mole of an alkali metal hydroxide, per each 2 moles of formaldehyde consumed in producing said hemiformal.

12. Method for the preparation of crystalline, 3,5-trimethylol-4,4'-dihydroxydiphenyl sulfone which comprises heating a salt of 3,3',5-trimethylol-4,4'-dihydroxydiphenyl sulfone in contact with a dialkyl sulfate to form the corresponding salt of 3,5-dimethylol-4,4'-dihydroxydiphenyl sulfone and hydrolyzing said salt.

13. Method as defined in claim 12 wherein the dialkyl sulfate is dimethyl sulfate.

14. Method as defined in claim 12 wherein the disodium salt of 3,3',5-trimethylol-4,4'-dihydroxydiphenyl sulfone is heated in contact with said dialkyl sulfate.

15. Method as defined in claim 12 wherein the reaction between said sulfone and said sulfate is conducted at a temperature of about 50° C. to about 110° C.

16. Method for the preparation of a crystalline, methylolated-4,4'-dihydroxydiphenyl sulfone having the formula:

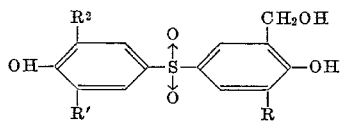

wherein R, R' and R² are members selected from the group consisting of hydrogen and methylol which comprises reacting 4,4'-dihydroxydiphenyl sulfone with at least about 2 moles of formaldehyde, per mole of said sulfone, in contact with about 1 to about 2 moles of an alkali metal hydroxide, per mole of said sulfone, to form the corresponding hemiformalated salt, hydrolyzing said hemiformalated salt to the corresponding phenolic compound and allowing said compound to lose formaldehyde to form the corresponding methylolated compound.

17. Method for the preparation of a crystalline, methylolated-4,4'-dihydroxydiphenyl sulfone having the formula:

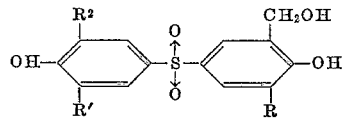

wherein R, R' and R² are members selected from the group consisting of hydrogen and methylol which comprises reacting 4,4'-dihydroxydiphenyl sulfone with at least about 2 moles of formaldehyde, per mole of said sulfone, in contact with about 1 to about 2 moles of an alkali metal hydroxide, per mole of said sulfone to form the corresponding hemiformalated salt, acidifying said salt to a pH of about 2 to about 3 thereby hydrolyzing said salt to the corresponding hemiformalated free phenol and water washing said hemiformalated free phenol to the corresponding methylolated compound.

References Cited by the Examiner

UNITED STATES PATENTS

| | | | |
|---|---|---|---|
| 1,901,536 | 3/1933 | Schafer | 260—838 |
| 2,174,287 | 9/1939 | Guthke | 260—49 |
| 2,320,678 | 6/1943 | Tassel | 260—49 |

FOREIGN PATENTS

| | | |
|---|---|---|
| 494,778 | 3/1930 | Germany. |

OTHER REFERENCES

Noller, Chemistry of Organic Compounds, W. B. Saunders, Philadelphia, 1957, QD 253 N65 (copy in Group 140), p. 505 relied on.

Shuter, Dopovidi Akademii nauk Ukrains'Koi—RSR, 1958, Nr4, 260–607A pp. 402–406 (U.S.S.R.).

MURRAY TILLMAN, *Primary Examiner.*

LEON J. BERCOVITZ, *Examiner.*